(12) United States Patent
Davis et al.

(10) Patent No.: US 10,556,525 B2
(45) Date of Patent: Feb. 11, 2020

(54) LINEAR INERTIAL LOCK

(71) Applicant: GOODRICH CORPORATION, Charlotte, NC (US)

(72) Inventors: Kenneth J. Davis, Menominee, MI (US); Robert E. Duckert, Coleman, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 21 days.

(21) Appl. No.: 16/020,268

(22) Filed: Jun. 27, 2018

(65) Prior Publication Data
US 2020/0001754 A1     Jan. 2, 2020

(51) Int. Cl.
| | | |
|---|---|---|
| *B60N 2/40* | (2006.01) | |
| *B60N 2/42* | (2006.01) | |
| *B64D 11/06* | (2006.01) | |
| *B60N 2/08* | (2006.01) | |

(52) U.S. Cl.
CPC ............. *B60N 2/43* (2013.01); *B60N 2/0881* (2013.01); *B64D 11/0639* (2014.12); *B64D 11/0696* (2013.01)

(58) Field of Classification Search
CPC ..... B60N 2/43; B60N 2/0881; B64D 11/0639
USPC ............. 297/216.1, 216.18; 70/261; 248/429
See application file for complete search history.

(56) References Cited

U.S. PATENT DOCUMENTS

| | | | |
|---|---|---|---|
| 5,878,859 A * | 3/1999 | Borlinghaus ........ | B60N 2/0705 192/84.1 |
| 7,748,778 B1 | 7/2010 | Udriste et al. | |
| 9,132,753 B1 | 9/2015 | Campbell | |
| 9,296,481 B2 | 3/2016 | Thompson et al. | |
| 9,346,381 B2 | 5/2016 | Thompson et al. | |

\* cited by examiner

*Primary Examiner* — Syed A Islam
(74) *Attorney, Agent, or Firm* — Snell & Wilmer, L.L.P.

(57) ABSTRACT

An inertial lock assembly is disclosed. In various embodiments, the inertial lock assembly includes a tracking rod oriented with respect to a longitudinal axis, a housing slidably disposed about the tracking rod, the housing including an inner surface having a first portion extending from an apex to a first end spaced longitudinally from the apex, a first sliding member slidably disposed about the tracking rod and within the housing proximate the first portion of the inner surface and a first binding member slidably disposed about the tracking rod and within the housing, the first binding member positioned between the apex and the first sliding member.

18 Claims, 4 Drawing Sheets

LINEAR INERTIAL LOCK

FIELD

The present disclosure relates generally to seating assemblies for aircraft and, more particularly, to inertial lock assemblies used for securing a seating assembly to an aircraft during rapid dynamic events.

BACKGROUND

Seating assemblies for transportation systems, such as aircraft, trains, automobiles and the like, may be provided with a sliding or translating mechanism that allows a seating assembly to slide or translate fore and aft with respect to a floor or support member connected to a floor. Such sliding or translational movement may be used, for example, to adjust leg room or to facilitate reclining of the seat assembly. In the event of a rapid dynamic event, such as a crash, inertial forces acting on the seat assembly, with or without a passenger, may result in undesirable and possibly dangerous movement of the seat assembly via the sliding or translating mechanism. An assembly for locking a seating assembly in place with respect to a floor or support member connected to a floor during a rapid dynamic event may, therefore, prove beneficial for the safety of a passenger seated within the seating assembly or other passengers in proximity of the seating assembly.

SUMMARY

An inertial lock assembly is disclosed. In various embodiments, the assembly includes a tracking rod oriented with respect to a longitudinal axis, a housing slidably disposed about the tracking rod, the housing including an inner surface having a first portion extending from an apex to a first end spaced longitudinally from the apex, a first sliding member slidably disposed about the tracking rod and within the housing proximate the first portion of the inner surface, and a first binding member slidably disposed about the tracking rod and within the housing, the first binding member positioned between the apex and the first sliding member.

In various embodiments, the assembly further includes a biasing member disposed within the housing and configured to bias the first binding member in a first direction opposite the apex. In various embodiments, further includes a first washer disposed between the biasing member and the first binding member. In various embodiments, the first binding member comprises a first plurality of ball bearings. In various embodiments, the first sliding member comprises a first collar.

In various embodiments, the first portion defines a first conical section extending from the apex to the first end. In various embodiments, the first conical section defines a first angle with respect to the longitudinal axis extending from the apex to the first end. In various embodiments, the inner surface has a second portion extending from the apex to a second end spaced longitudinally from the apex, the apex being disposed intermediate the first end and the second end.

In various embodiments, the assembly further includes a second sliding member slidably disposed about the tracking rod and within the housing proximate the second portion of the inner surface and a second binding member slidably disposed about the tracking rod and within the housing, the second binding member positioned between the apex and the second sliding member. In various embodiments, the second portion defines a second conical section extending from the apex to the second end. In various embodiments, the second conical section defines a second angle with respect to the longitudinal axis extending from the apex to the second end.

In various embodiments, the assembly further includes a biasing member disposed within the housing and configured to bias the first binding member in a first direction opposite the apex and the second binding member in a second direction opposite the apex. In various embodiments, the first binding member comprises a first plurality of ball bearings and the second binding member comprises a second plurality of ball bearings. In various embodiments, the first sliding member comprises a first collar and the second sliding member comprises a second collar.

A seat assembly is disclosed. In various embodiments, the assembly includes a seat frame having a longitudinal axis; a tracking rod oriented with respect to the longitudinal axis, the tracking rod having a fore end connected to a fore member of the seat frame and an aft end connected to an aft member of the seat frame; a housing slidably disposed about the tracking rod, the housing including an inner surface having a first portion extending from an apex to a first end spaced longitudinally from the apex; a first sliding member slidably disposed about the tracking rod and within the housing proximate the first portion of the inner surface; and a first binding member slidably disposed about the tracking rod and within the housing, the first binding member positioned between the apex and the first sliding member.

In various embodiments, the assembly further includes a second portion of the inner surface, the second portion extending from the apex to a second end spaced longitudinally from the apex, the apex being disposed intermediate the first end and the second end; a second sliding member slidably disposed about the tracking rod and within the housing proximate the second portion of the inner surface; and a second binding member slidably disposed about the tracking rod and within the housing, the second binding member positioned between the apex and the second sliding member. In various embodiments, the first portion defines a first conical section extending from the apex to the first end and the second portion defines a second conical section extending from the apex to the second end.

A seating system for a vehicle is disclosed. In various embodiments, the system includes a substructure configured for attachment to a floor of the vehicle; a seat frame slidably engaged with the substructure, the seat frame configured to slide in a fore direction and an aft direction along a longitudinal axis; a tracking rod oriented with respect to the longitudinal axis, the tracking rod having a fore end connected to a fore member of the seat frame and an aft end connected to an aft member of the seat frame; a housing slidably disposed about the tracking rod, the housing including an inner surface having a first portion extending from an apex to a first end spaced longitudinally from the apex and a second portion extending from the apex to a second end spaced longitudinally from the apex, the apex being disposed intermediate the first end and the second end; a first sliding member slidably disposed about the tracking rod and within the housing proximate the first portion of the inner surface; a first binding member slidably disposed about the tracking rod and within the housing, the first binding member positioned between the apex and the first sliding member; a second sliding member slidably disposed about the tracking rod and within the housing proximate the second portion of the inner surface; and a second binding member slidably disposed about the tracking rod and within the housing, the second binding member positioned between the apex and the second sliding member.

In various embodiments, the system further includes a first sleeve member positioned adjacent an aft portion of the housing and connected to the substructure and a second sleeve member positioned adjacent a fore portion of the housing and connected to the substructure. In various embodiments, the first binding member comprises a first plurality of ball bearings and the second binding member comprises a second plurality of ball bearings and wherein the first sliding member comprises a first collar and the second sliding member comprises a second collar.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
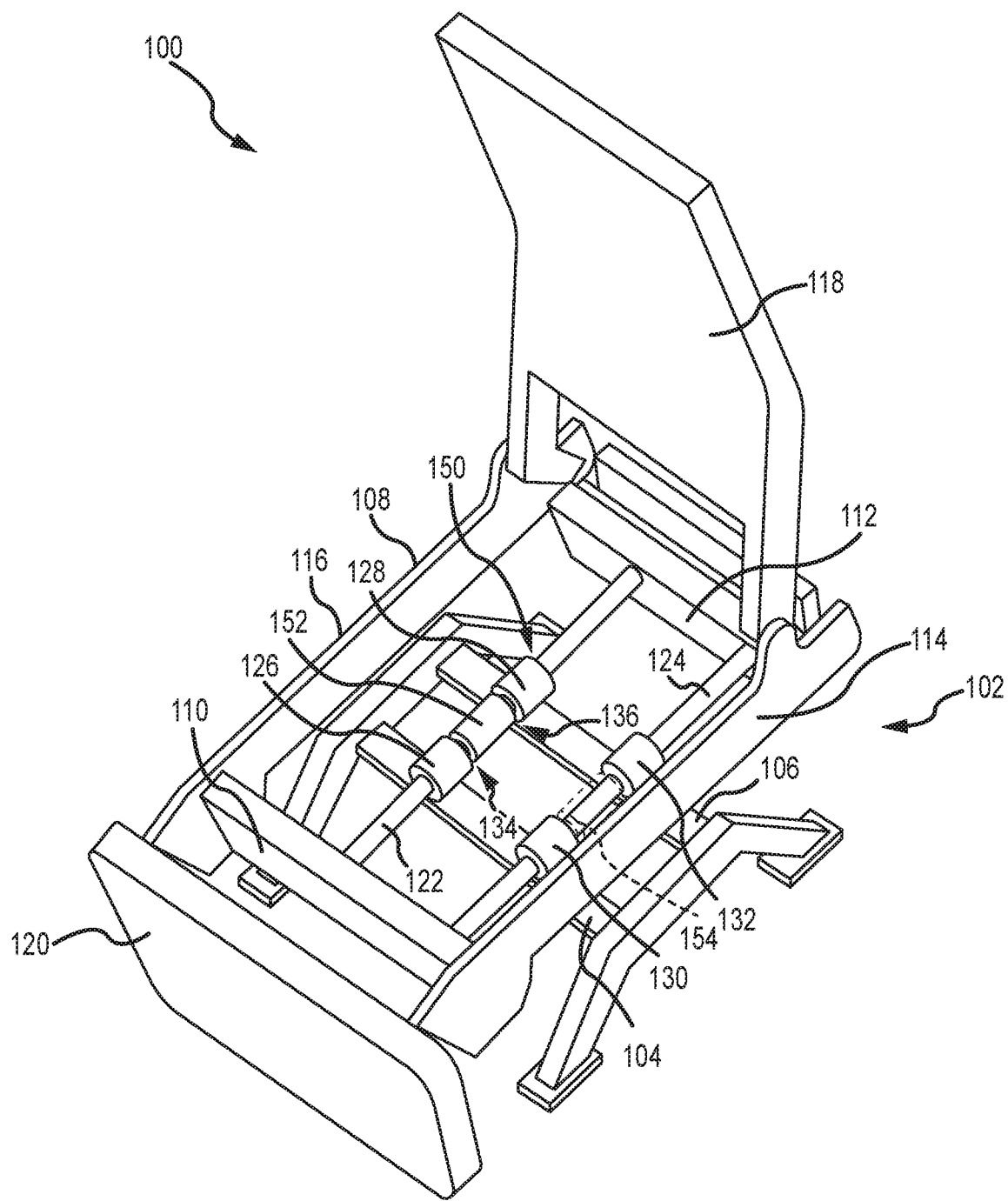
FIG. 1 is a schematic perspective view of a seat frame having an inertial lock assembly, in accordance with various embodiments.

Referring now to the drawings, FIG. 1 schematically illustrates a perspective view of a seat assembly 100 that may be used in an aircraft, a train, a bus or some other form of transportation. The seat assembly 100 may be connected to a floor via a base substructure 102 which, in various embodiments, may include a first lateral rail 104 and a second lateral rail 106 that extend laterally across a width of a seat frame 108 and provide structure upon which to secure the seat frame 108. In various embodiments, the seat frame 108 includes a front member 110 and a rear member 112, connected by a left member 114 and a right member 116, the collection of which forms a generally square or rectangular structure. In various embodiments, a back frame 118 and a foot frame 120 may be secured to the seat frame 108 and configured for reclining or retracting in typical fashion.

In various embodiments, a first tracking rod 122 extends from the front member 110 to the rear member 112 and is attached thereto using suitable means, such as, for example, welding or bolting. Similarly, in various embodiments, a second tracking rod 124 extends from the front member 110 to the rear member 112 and is attached thereto using suitable means. In various embodiments, a first sleeve member 126 is employed to couple the first tracking rod 122 to the first lateral rail 104 and a second sleeve member 128 is employed to couple the first tracking rod 122 to the second lateral rail 106. Similarly, in various embodiments, a third sleeve member 130 is employed to couple the second tracking rod 124 to the first lateral rail 104 and a fourth sleeve member 132 is employed to couple the second tracking rod 124 to the second lateral rail 106. In various embodiments, each of the first sleeve member 126, the second sleeve member 128, the third sleeve member 130 and the fourth sleeve member 132 are configured to enable the seat frame 108 to translate forward and backward with respect to the base substructure 102. In various embodiments, each of the first sleeve member 126, the second sleeve member 128, the third sleeve member 130 and the fourth sleeve member 132 comprise a sliding structure (e.g., a pillow block) that enable the first tracking rod 122 and the second tracking rod 124 to slide forward and backward through the corresponding sleeve members.

Still referring to FIG. 1, in various embodiments, an inertial lock 152 is slidably disposed on the first tracking rod 122 and positioned intermediate the first sleeve member 126 and the second sleeve member 128. In various embodiments, the inertial lock 152 is maintained in position on the first tracking rod 122 without connection to the first sleeve member 126 or to the second sleeve member 128. In various embodiments, a first gap 134 is allowed to occur between the first sleeve member 126 and the inertial lock 152 and a second gap 136 is allowed to occur between the second sleeve member 128 and the inertial lock 152. In various embodiments, one or both of the first gap 134 and the second gap 136 enable acceleration of the inertial lock 152 in the event of a rapid dynamic event, such as a crash. In various embodiments, a second inertial lock 154 may be slidably disposed on the second tracking rod 124 and positioned between third sleeve member 130 and the fourth sleeve member 132. The second inertial lock 154 may be described as having the same positional and mounting characteristics described above with respect to the inertial lock 152. As described further below, in various embodiments, an inertial lock assembly 150 may be defined as comprising the first tracking rod 122 and the inertial lock 152. In various embodiments, the inertial lock assembly may further be defined as including the first sleeve member 126 and the second sleeve member 128.

Figure 2A:
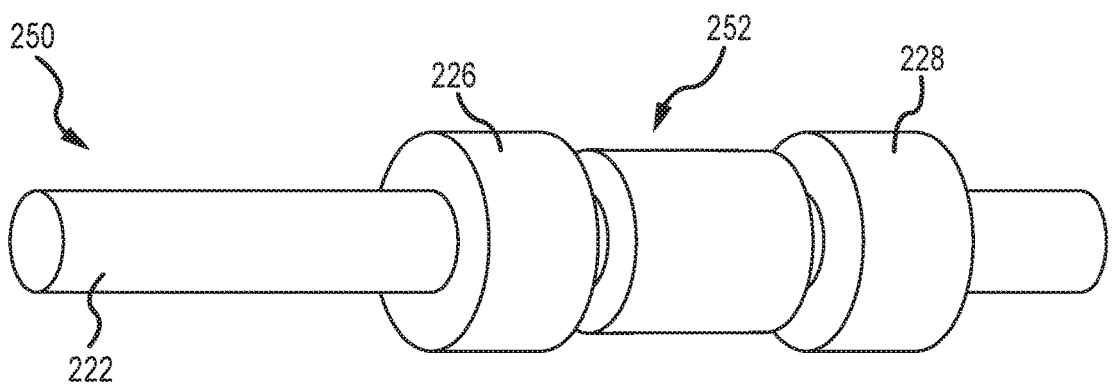
FIGS. 2A and 2B are schematic perspective views, exploded and assembled, respectively, of an inertial lock assembly, in accordance with various embodiments.
Figure 2B:
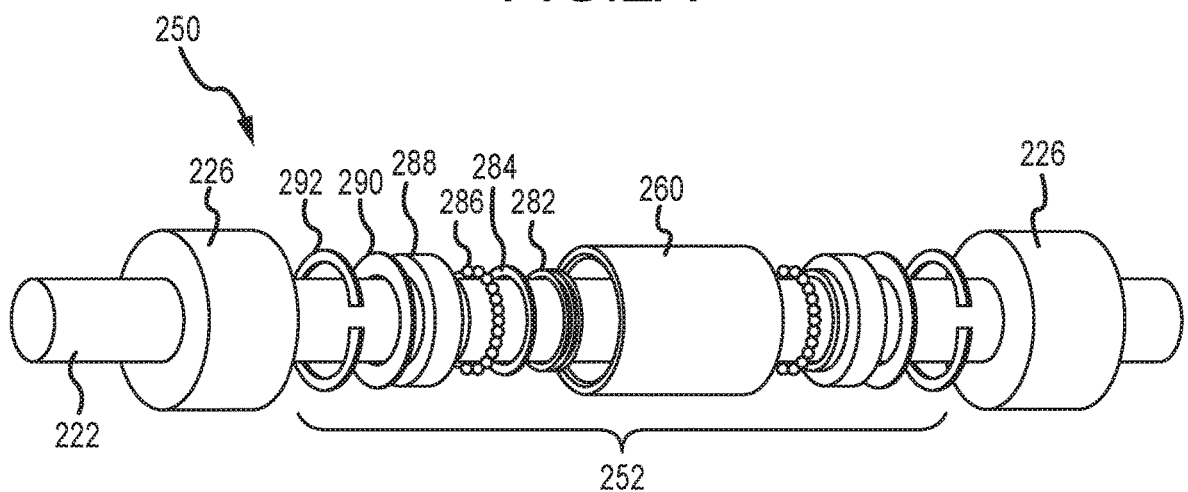
Figure 2C:
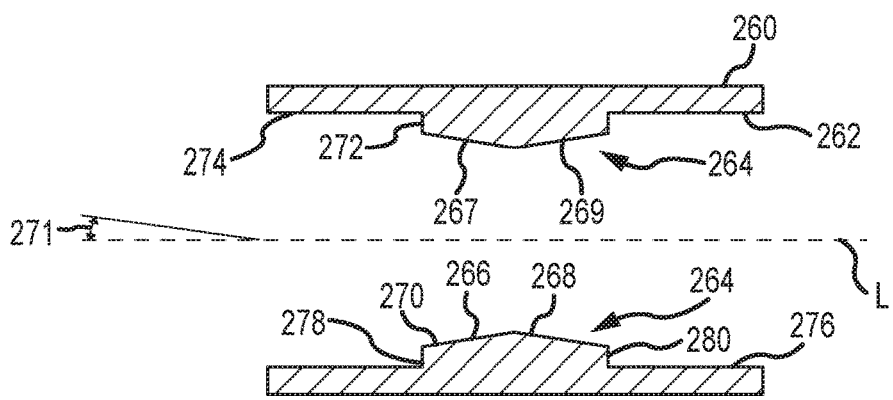
FIG. 2C is a schematic cutaway view of a housing illustrated in FIGS. 2A and 2B, in accordance with various embodiments.

Referring now to FIGS. 2A, 2B and 2C, an inertial lock assembly 250 is illustrated, in accordance with various embodiments. The inertial lock assembly 250 includes a tracking rod 222, an inertial lock 252 and a first sleeve member 226 and a second sleeve member 228. In various embodiments, the inertial lock 252 includes a housing 260 having an inner surface 262. In various embodiments, the inner surface 262 defines a triangular shaped segment 264 that extends in axisymmetric fashion about the inner surface of the housing 260. The triangular shaped segment 264 may include, in various embodiments, an apex 266 and a first portion 268 (or first side) and a second portion 270 (or second side). In various embodiments, the first portion 268 defines a first conical section 267 extending from the apex 266 to a first end 278 spaced longitudinally (or axially) from the apex 266. In various embodiments, the second portion 270 defines a second conical section 269 extending from the apex 266 to a second end 280 spaced longitudinally (or axially) from the apex 266, with the apex 266 being disposed intermediate (e.g., in between) the first end 278 and the second end 280. In various embodiments, the triangular shaped segment 264 is raised on a base portion 272, such that the triangular shaped segment 264 (or the base leg of the triangle forming the segment) is positioned radially inward of and intermediate a first annular portion 274 and a second annular portion 276. It will be appreciated that while the foregoing is described in terms of triangles and conics, etc., the disclosure contemplates the inner surface 262 being defined by surfaces having various degrees of curvature—e.g., the first portion 268 (or first side) and the second portion 270 (or the second side) need not be defined by straight sides or surfaces, but may be defined by sides or surfaces having various degrees of convex or concave curvature with respect to a longitudinal axis L extending through the housing 260. In various embodiments, the first portion 268 and the second portion 270 (or the first conical section 267 and the second conical section 269) define an angle 271 with respect to the longitudinal axis L of between about five degrees (5°) and about nine degrees (9°) and, in various embodiments, of about seven degrees (7°).

Referring still to FIGS. 2A, 2B and 2C, the inertial lock 252 component of the inertial lock assembly 250 further includes, a biasing member 282 (e.g., a coil spring) configured for positioning proximate a central portion of the housing 260 and, in order of installation from both sides of the housing 260, first and second washers 284, first and second binding members 286 (e.g., first and second pluralities of ball bearings), first and second sliding members 288 (e.g., collars), third and fourth washers 290 and first and second retaining members 292 (e.g., circlips). Described further below is the operation and assembly of the various components just described, in accordance with various embodiments.

Figure 3:
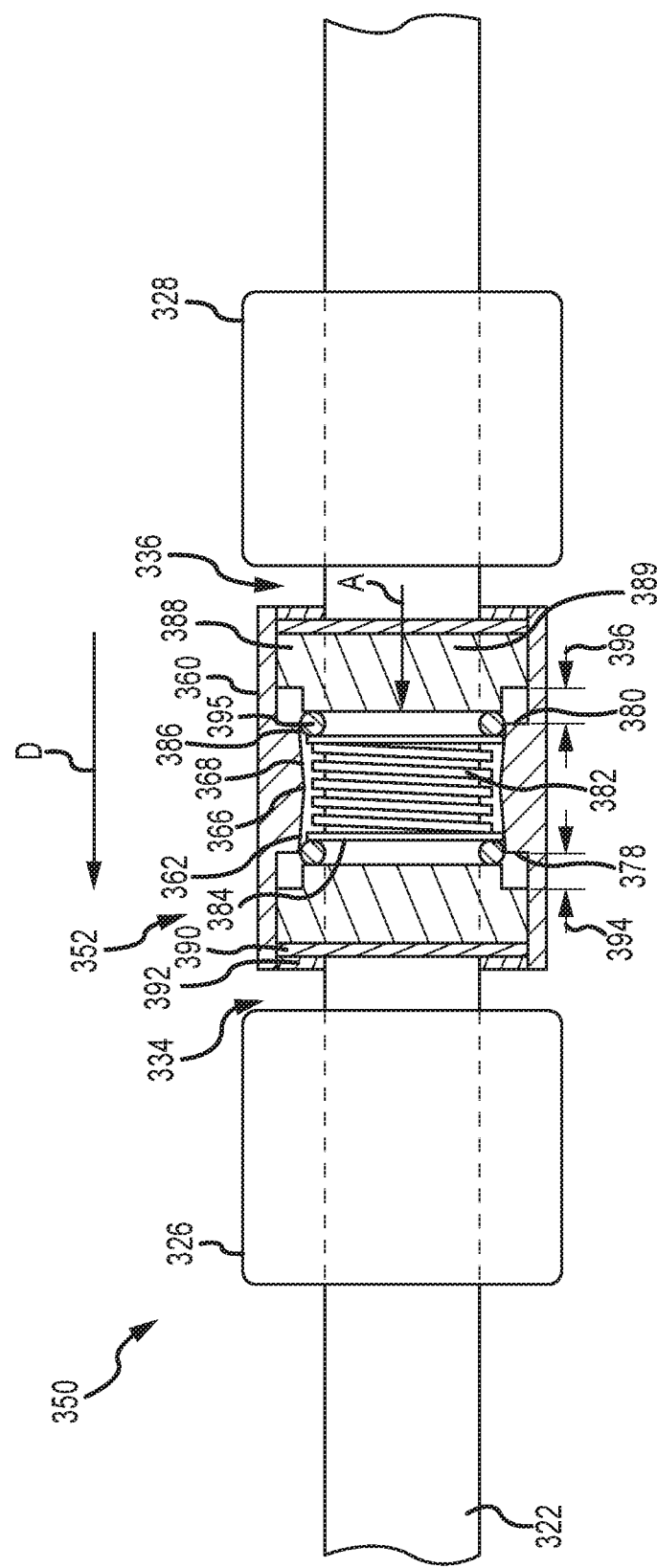
FIG. 3 is a schematic side view of an inertial lock assembly, in accordance with various embodiments.

Referring now to FIG. 3, a schematic side view of an inertial lock assembly 350 is illustrated in accordance with various embodiments. Similar to the above discussion, the inertial lock assembly 350, in various embodiments, includes a tracking rod 322, an inertial lock 352 and a first sleeve member 326 and a second sleeve member 328. Also similar to the foregoing, the inertial lock 352 includes a housing 360 and various subcomponents within the housing 360, including a biasing member 382 (e.g., a coil spring), first and second washers 384, first and second binding members 386 (e.g., first and second pluralities of ball bearings), first and second sliding members 388 (e.g., collars), third and fourth washers 390 and first and second retaining members 392 (e.g., circlips). In various embodiments, the subcomponents are positioned symmetric about an apex 366 on an inner surface 362 of the housing 360, though non-symmetric positioning of the subcomponents is contemplated by the disclosure. Further, the disclosure also contemplates embodiments using fewer or greater numbers of the subcomponents identified above—e.g., one or more of the first and second washers 384 and the third and fourth washers 390 may be eliminated in various embodiments. In various embodiments, the housing 360 includes the characteristics and geometric features of the housing 260, described above with reference to FIG. 2C, and so are not repeated.

As described above with reference to FIG. 1, the inertial lock 352, in various embodiments, is positioned between the first sleeve member 326 and the second sleeve member 328. In various embodiments, a first gap 334 and a second gap 336 are provided to permit the inertial lock 352 to accelerate during a rapid dynamic event, such as a crash, prior to contacting one of the first sleeve member 326 and the second sleeve member 328. In various embodiments, no such gaps are provided, as the first and second sliding members 388 are configured to accelerate within the housing 360 to provide the locking effect regardless. More specifically, in various embodiments, the first and second sliding members 388 and are separated by a first spacing 394 and a second spacing 396 from their respective first end 378 and second end 380. In various embodiments, the biasing member 382 functions to ensure the first spacing 394 and the second spacing 396 are present by urging the first and second sliding members 388 away from their respective first end 378 and second end 380 of the inner surface 362 of the housing 360. In various embodiments, the biasing member 382 also functions to urge the first and second binding members 386 in a direction away from the apex 366 to prevent inadvertent binding during normal operation (i.e., during everyday operation absent a rapid deceleration event).

During a rapid dynamic event, causing rapid deceleration of the inertial lock assembly 350, one of the first and second sliding members 388 will accelerate within the housing 360, depending on the direction of deceleration, thereby driving one of the corresponding first and second binding members 386 into the inner surface 362 of the housing and against the tracking rod 322, such that the housing 360 is prevented from translating farther along the tracking rod 322. For example, during a rapid deceleration in the direction indicated by the arrow D, a sleeve member 389 will rapidly accelerate in the same direction, as indicated by the arrow A. The rapid acceleration of the sleeve member 389 will drive a binding member 395, corresponding to the sleeve member 389, into an angled portion 368 (e.g., a conical section) of the inner surface 362 toward the apex 366. The tapering feature of the angled portion 368 will cause the binding member 395 (e.g., a plurality of ball bearings) to bind the housing 360 against the tracking rod 322. With brief reference to FIG. 1, where the inertial lock 152 is bound against the first tracking rod 122, the seat assembly 100 is prevented from further motion with respect to the base substructure 102 (attached to the floor) by virtue of the first sleeve member 126 (for deceleration toward the forward direction) and the second sleeve member 128 (for deceleration toward the aft direction) being secured to the base substructure 102 (e.g., through the first lateral rail 104 and the second lateral rail 106, respectively). A similar description applies where the direction of deceleration is opposite the direction indicated by the arrow D, the difference being the subcomponents on the opposite side of the apex 366 being the functioning elements resulting in the locking of the inertial lock assembly 350.

In various embodiments, the materials used to construct the housing 360 and the first and second binding members 386 may be advantageously selected to hasten the binding process. In various embodiments, for example, the housing 360 is constructed of a softer or more deformable material than the first and second binding members 386 to enable the binding members to be driven into and deform the inner surface 362 of the housing 360. In various embodiments, the housing 360 is constructed using aluminum or an aluminum alloy and the first and second binding members 386 are constructed from steel or stainless steel—e.g., the first and second binding members 386 may comprise first and second pluralities of stainless steel ball bearings or roller members. In various embodiments, the first and second sliding members 388 are advantageously constructed of heavy and high-strength materials, such as, for example, steel or stainless steel, to facilitate development of sufficient inertial momentum during the rapid acceleration to drive the first and second binding members 386 into the housing 360 without themselves being deformed. These materials, or materials with similar strength characteristics and properties, enable a seat assembly, such as the seat assembly 100 referred to in FIG. 1, to operate normally for extended periods of time or complete lifetime cycles while, at the same time, possess the desired characteristics and properties to rapidly lock a seat assembly in place during a rapid deceleration event, such as a crash.

Figure 4:
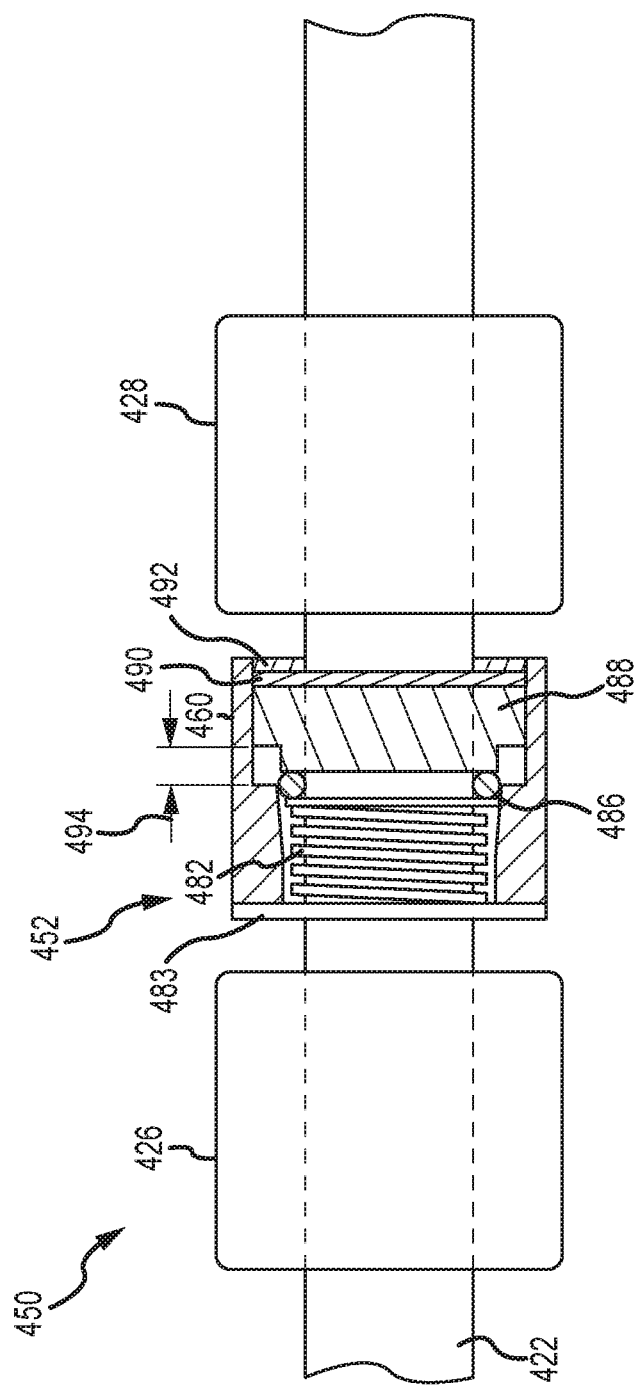
FIG. 4 is a schematic side view of an inertial lock assembly, in accordance with various embodiments.

Referring now to FIG. 4, a schematic side view of an inertial lock assembly 450 is illustrated in accordance with various embodiments. The inertial lock assembly 450 shares many of the construction and operational characteristics described above, the main difference being the inertial lock assembly 450 is configured for operation in only one direction, whereas the inertial lock assembly 350 described with reference to FIG. 3 is configured for operation in two directions. Described briefly, the inertial lock assembly 450, in various embodiments, includes a tracking rod 422, an inertial lock 452 and a first sleeve member 426 and a second sleeve member 428. Also similar to the foregoing, the inertial lock 452 includes a housing 460 and various subcomponents within the housing 460, including a biasing member 482 (e.g., a coil spring), a washer 484, a binding member 486 (e.g., a plurality of ball bearings), and a sliding member 488 (e.g., collar). A retaining structure 483 is suitably fastened to the housing 460 to provide structure for the biasing member 482 to push against to maintain a spacing 494, similar to one of the first spacing 394 and the second spacing 396 described above with reference to FIG. 3. In various embodiments, the housing 460 includes the characteristics and geometric features of the housing 260, described above with reference to FIG. 2C, but only one side of the housing is here present due to the single-direction mode of operation during a rapid deceleration event. The operational characteristics of the inertial lock assembly 450 are near identical to those described above with regard to the inertial lock assembly 350 referenced in FIG. 3.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Further, throughout the present disclosure, like reference numbers denote like elements. Accordingly, elements with element numbering may be shown in the figures, but may not necessarily be repeated herein for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An inertial lock assembly, comprising:
a tracking rod oriented with respect to a longitudinal axis;
a housing slidably disposed about the tracking rod, the housing including an inner surface having a first portion extending from an apex to a first end spaced longitudinally from the apex;

a first sliding member slidably disposed about the tracking rod and within the housing proximate the first portion of the inner surface;

a first binding member slidably disposed about the tracking rod and within the housing, the first binding member positioned between the apex and the first sliding member; and a biasing member disposed within the housing and configured to bias the first binding member in a first direction opposite the apex.

2. The inertial lock assembly of claim 1, further comprising a first washer disposed between the biasing member and the first binding member.

3. The inertial lock assembly of claim 1, wherein the first binding member comprises a first plurality of ball bearings.

4. The inertial lock assembly of claim 3, wherein the first sliding member comprises a first collar.

5. The inertial lock assembly of claim 1, wherein the first portion defines a first conical section extending from the apex to the first end.

6. The inertial lock assembly of claim 5, wherein the first conical section defines a first angle with respect to the longitudinal axis extending from the apex to the first end.

7. The inertial lock assembly of claim 1, wherein the inner surface has a second portion extending from the apex to a second end spaced longitudinally from the apex, the apex being disposed intermediate the first end and the second end.

8. The inertial lock assembly of claim 7, further comprising:
a second sliding member slidably disposed about the tracking rod and within the housing proximate the second portion of the inner surface; and
a second binding member slidably disposed about the tracking rod and within the housing, the second binding member positioned between the apex and the second sliding member.

9. The inertial lock assembly of claim 8, wherein the second portion defines a second conical section extending from the apex to the second end.

10. The inertial lock assembly of claim 9, wherein the second conical section defines a second angle with respect to the longitudinal axis extending from the apex to the second end.

11. The inertial lock assembly of claim 10, further comprising a biasing member disposed within the housing and configured to bias the first binding member in a first direction opposite the apex and the second binding member in a second direction opposite the apex.

12. The inertial lock assembly of claim 11, wherein the first binding member comprises a first plurality of ball bearings and the second binding member comprises a second plurality of ball bearings.

13. The inertial lock assembly of claim 12, wherein the first sliding member comprises a first collar and the second sliding member comprises a second collar.

14. A seat assembly, comprising:
a seat frame having a longitudinal axis;
a tracking rod oriented with respect to the longitudinal axis, the tracking rod having a fore end connected to a fore member of the seat frame and an aft end connected to an aft member of the seat frame;
a housing slidably disposed about the tracking rod, the housing including an inner surface having a first portion extending from an apex to a first end spaced longitudinally from the apex and a second portion extending from the apex to a second end spaced longitudinally from the apex, the apex being disposed intermediate the first end and the second end;
a first sliding member slidably disposed about the tracking rod and within the housing proximate the first portion of the inner surface;
a second sliding member slidably disposed about the tracking rod and within the housing proximate the second portion of the inner surface;
a first binding member slidably disposed about the tracking rod and within the housing, the first binding member positioned between the apex and the first sliding member; and
a second binding member slidably disposed about the tracking rod and within the housing, the second binding member positioned between the apex and the second sliding member.

15. The seat assembly of claim 14, wherein the first portion defines a first conical section extending from the apex to the first end and the second portion defines a second conical section extending from the apex to the second end.

16. A seating system for a vehicle, comprising:
a substructure configured for attachment to a floor of the vehicle;
a seat frame slidably engaged with the substructure, the seat frame configured to slide in a fore direction and an aft direction along a longitudinal axis;
a tracking rod oriented with respect to the longitudinal axis, the tracking rod having a fore end connected to a fore member of the seat frame and an aft end connected to an aft member of the seat frame;
a housing slidably disposed about the tracking rod, the housing including an inner surface having a first portion extending from an apex to a first end spaced longitudinally from the apex and a second portion extending from the apex to a second end spaced longitudinally from the apex, the apex being disposed intermediate the first end and the second end;
a first sliding member slidably disposed about the tracking rod and within the housing proximate the first portion of the inner surface;
a first binding member slidably disposed about the tracking rod and within the housing, the first binding member positioned between the apex and the first sliding member;
a second sliding member slidably disposed about the tracking rod and within the housing proximate the second portion of the inner surface; and
a second binding member slidably disposed about the tracking rod and within the housing, the second binding member positioned between the apex and the second sliding member.

17. The vehicle seating system of claim 16, further comprising a first sleeve member positioned adjacent an aft portion of the housing and connected to the substructure and a second sleeve member positioned adjacent a fore portion of the housing and connected to the sub structure.

18. The vehicle seating system of claim 17, wherein the first binding member comprises a first plurality of ball bearings and the second binding member comprises a second plurality of ball bearings and wherein the first sliding member comprises a first collar and the second sliding member comprises a second collar.

* * * * *

UNITED STATES PATENT AND TRADEMARK OFFICE
CERTIFICATE OF CORRECTION

PATENT NO. : 10,556,525 B2
APPLICATION NO. : 16/020268
DATED : February 11, 2020
INVENTOR(S) : Kenneth J. Davis et al.

Page 1 of 1

It is certified that error appears in the above-identified patent and that said Letters Patent is hereby corrected as shown below:

In the Claims

In Column 10, Line 57, please delete "sub structure." and insert -- substructure. --

Signed and Sealed this
Ninth Day of March, 2021

Drew Hirshfeld
*Performing the Functions and Duties of the
Under Secretary of Commerce for Intellectual Property and
Director of the United States Patent and Trademark Office*